(12) United States Patent
Sobolev et al.

(10) Patent No.: US 6,896,856 B2
(45) Date of Patent: May 24, 2005

(54) INSTALLATION FOR VITRIFICATION OF LIQUID RADIOACTIVE WASTES, COOLED DISCHARGE UNIT AND COOLED INDUCTION MELTER FOR THE INSTALLATION

(75) Inventors: Igor Andreevich Sobolev, Moscow (RU); Sergei Alexandrovich Dmitriev, Moscow (RU); Fedor Anatolievich Lifanov, Sergiev Posad (RU); Alexandr Pavlovich Kobelev, Moskovskaya oblast (RU); Alexandr Evgenievich Savkin, Sergiev Posad (RU); Vladimir Nikolaevich Zakharenko, Sergiev Posad (RU); Vladimir Ivanovich Kornev, Sergiev Posad (RU); Oleg Anatolievich Knyazev, Moskovskaya oblast (RU)

(73) Assignee: Moskovskoe Gosudarstvennoe Predpriyatie-Obiedinenny Ekologo-Technolgichesky I Nauchno-Issledovatelsky-Tsentr PO Obezvrezhivaniju Rao I Okhrane Okruzhajuschei Sredy Mosnpo ("Radon"), Moscow (RU)

( * ) Notice: Subject to any disclaimer, the term of this patent is extended or adjusted under 35 U.S.C. 154(b) by 0 days.

(21) Appl. No.: 10/612,158

(22) Filed: Jul. 2, 2003

(65) Prior Publication Data

US 2004/0022697 A1 Feb. 5, 2004

Related U.S. Application Data

(62) Division of application No. 09/515,844, filed on Feb. 29, 2000, now Pat. No. 6,613,291, which is a division of application No. 09/061,483, filed on Apr. 16, 1998, now Pat. No. 6,058,741.

(30) Foreign Application Priority Data

Sep. 9, 1997 (RU) ............................................. 97114712

(51) Int. Cl.$^7$ .......................... B01J 19/06; C03B 5/23; C03B 5/26
(52) U.S. Cl. .................... 422/198; 422/200; 422/202; 422/159; 65/324; 65/326; 65/330
(58) Field of Search ......................... 65/300, 127, 498, 65/126, 128, 134.8, 324–327; 588/11, 252, 900, 20; 422/198, 200, 202, 159

(56) References Cited

U.S. PATENT DOCUMENTS

| | | | |
|---|---|---|---|
| RE20,522 E | * 9/1937 | Weber | ........................... 65/84 |
| 2,790,019 A | * 4/1957 | Stalego | ........................ 373/35 |
| 4,350,516 A | * 9/1982 | Faulkner et al. | ............... 65/327 |
| 4,514,329 A | 4/1985 | Wakabayashi et al. | ...... 252/629 |
| 4,592,898 A | 6/1986 | Kaufmann et al. | ......... 422/159 |
| 4,816,228 A | 3/1989 | Yoshida et al. | ............. 422/159 |
| 4,871,521 A | 10/1989 | Pendergraft | ................. 423/230 |
| 4,957,527 A | 9/1990 | Hnat | ............................. 65/19 |
| 4,994,256 A | 2/1991 | Minet et al. | ................ 423/502 |
| 5,280,496 A | 1/1994 | Schlecht et al. | ............ 373/158 |
| 5,424,042 A | 6/1995 | Mason et al. | ............... 422/159 |
| 5,564,102 A | 10/1996 | Igarashi et al. | ............... 588/11 |
| 5,882,581 A | 3/1999 | Gotovhikov et al. | ....... 266/241 |

* cited by examiner

Primary Examiner—Hien Tran
Assistant Examiner—Jennifer Leung
(74) Attorney, Agent, or Firm—Ladas & Parry LLP (57) ABSTRACT

A cooled discharge unit of an apparatuses for processing homogeneous/heterogeneous radioactive wastes with ion-exchange resins. The cooled discharge unit has a discharge pipe, a cooling jacket having a U-shaped form in cross section, a collector for feeding a coolant into the jacket, a discharge gate having a pipe, on one end of which is a cone-shaped tip and on the other end of which is a lid with an aperture.

6 Claims, 4 Drawing Sheets

FIG. 6

INSTALLATION FOR VITRIFICATION OF LIQUID RADIOACTIVE WASTES, COOLED DISCHARGE UNIT AND COOLED INDUCTION MELTER FOR THE INSTALLATION

"This application is a divisional application Ser. No. 09/515,844 filed on Feb. 29, 2000, now U.S. Pat. No. 6,613,291, which is a divisional of Ser. No. 09/061,483 filed Apr. 16, 1998 (now U.S. Pat. 6,058,741) claims the benefit thereof and incorporates the sane by reference."

FIELD OF THE INVENTION

The present invention relates to apparatuses for processing radioactive wastes, and more exactly to an installation for vitrification of liquid homogeneous/heterogeneous radioactive wastes, including those comprising ion-exchange resins, and also to a cooled discharge unit and a cooled induction melter for that installation.

BACKGROUND OF THE INVENTION

The invention may be used for hardening liquid radioactive wastes by transferring them into a solid stable vitriform state suitable for long-term storage in special storages.

An apparatus is known for supplying different fractions of material (see, for example, U.S. Pat. No. 3,964,892, 1976), comprising a metal housing having a flat bottom, a refractory reflector positioned on the inner surfaces of the metal housing and the flat bottom, a tubular channel for discharge of the melt which is positioned in the flat bottom and has a reduced inlet aperture which is closed by means of a rod which controls the output of glass melt, electrodes positioned at an angle of 120 degrees, a coil-in-box cooler positioned on the external side of the upper part of the metal housing, a charging device and a turning-positioning mechanism for the rod.

The danger of operation with the apparatus is high because of the high chemical corrosion of the electrodes and the refractory reflector. The durability of the apparatus is low because of the burn-out of the electrodes and the short service life of the refractory reflector. Furthermore, during the discharge there is the danger of the occurrence of an emergency situation due to the danger of the tubular channel overheating, of its higher chemical corrosion due to the unguaranteed closure of its reduced inlet aperture because of the higher chemical corrosion of the rod and the tubular discharge channel, and also because of the danger of the formation of a hard-to-remove glass plug in the tubular discharge channel.

A Joule melter is known for processing radioactive wastes (see, for example, Europatent 0 137 579, 1985), comprising a steel casting closed at the top by a steel lid, the inner surface of which is lined with a refractory material. A jumper is positioned on the bottom part of the refractory material, an electrode of cylindrical shape is positioned around the jumper, wherein a partition of cylindrical shape having an aperture is positioned inside the electrode, while a starting heater is positioned on the external side. An outlet pipe for the discharge of glass melt is located in the center of the bottom part, this pipe being simultaneously a second electrode and with its upper part being covered by a truncated cone with an aperture. A pipe of large diameter for the discharge of waste gases, an inlet pipe for loading the radioactive wastes and vitrification agents, and also a movable plunger with a conical end-piece ensuring closure of the aperture of the truncated cone are positioned in the steel lid.

Due to the burn-out of the electrode of cylindrical shape, which is a part of the melter housing, and of the second electrode, which is an outlet pipe for the discharge of the glass melt, and also due to the higher carrying away of radio nuclides, there is high danger in the operation of the melter.

Since the jumper has a reduced, temporary service life, the durability of melter operation is also low. And due to the greater amount of time necessary to create a starting melt by means of the starting heater, the productivity is low.

This melter has a narrow field of use due to the fact that it is not possible to process dehydrated radioactive wastes which contain ion-exchange resins which during melting may plug the uncooled inlet pipe for loading, or to process moist radioactive wastes which contain ion-exchange resins which may cause short circuiting of the electrodes through the moist radioactive wastes which are on the surface of the glass melt.

The danger of the occurrence of an emergency situation during discharge is also present in the aforesaid melter due to the blocking up of the outlet pipe for the discharge of melt, the impossibility of clearing it with a plunger, the danger of its overheating, high chemical corrosion, and also its burning out.

A method and apparatus for vitrification of radioactive materials is known (see, for example, British patent 1, 239 710, 1971). The apparatus for vitrification of radioactive materials is a crucible provided with a cooling system and with an induction coil connected to a high frequency generator. On top the crucible is closed with a metal lid with apertures to which a calciner and a bunker with vitrification agents, which is provided with a vibrating feeder, are connected. There is a discharge device at the bottom of the crucible which is a discharge pipe provided with a water-cooled jacket and an inductance coil connected to a high frequency generator.

There is a high degree of danger during operation of the apparatus due to high chemical corrosion of the housing of the crucible, the danger of its mechanical breakdown in the presence of high thermal stresses caused by a large difference between the temperature on the outer and inner surfaces, and also due to an increase in the degree of votalization of radio nuclides due to the use of a calciner for calcinating radioactive materials.

Furthermore, the melter has reduced productivity due to the absence of a mixer for preliminary mixing of the calcinate of radioactive materials and the vitrification agents, and also due to the immobility of the inductance coil of the crucible.

The field of use of the apparatus is also limited due to the fact that it is not possible to process ion-exchange resins which due to their melting in the calciner will plug the inlet pipe for loading the calcinate of radioactive materials.

During the discharge an emergency situation may arise since there is no discharge gate and this may be the reason for unauthorized discharge of the glass melt from the crucible.

SUMMARY OF THE INVENTION

The object of the present invention is to create an installation for vitrification of liquid homogeneous and heterogeneous radioactive wastes which may include ion-exchange resins, and also radioactive pearlite, activated carbon, sand, in which the use of a water-cooled induction melter with a cooled discharge unit and a movable inductor, of an evaporator for dehydrating liquid radioactive wastes, of a vortex apparatus and a separate system for purification of gas make it possible to carry out the processing of radioactive wastes with minimum contamination of the environment, eliminating the discharge of radioactive gaseous and dust-like substances into the atmosphere, to raise the safety of operation of the device, its reliability and productivity, and also to expand the field of use of the device, ensuring the possibility of processing radioactive wastes which have different compositions.

Another object of the invention is to create a cooled discharge unit for the water-cooled induction melter, the construction of which would make it possible to eliminate unauthorized discharge of the vitriform melt from the induction melter, to ensure reliable closure of the discharge unit after discharge, to avoid overheating of the housing of the discharge unit and to accomplish constant reliable cooling of all the elements of the discharge unit, which in turn makes it possible to eliminate the occurrence of emergency situations during discharge and to enhance the durability.

One more object of the invention is to create a water-cooled induction melter in which the use of a cooled discharge unit and also a movable inductor makes it possible to accomplish the processing of moist radioactive wastes and to increase the productivity of the apparatus.

The aforesaid object is achieved in that a cooled discharge unit in accordance with the invention comprises:

a discharge pipe;

a cooled jacket having a U-shaped form in cross section and disposed on said discharge pipe;

a lid covering said cooled jacket and said discharge pipe;

a lug in the form of a truncated cone made in said lid from the side facing the discharge pipe;

a through cylindrical aperture made in said lug, a longitudinal axis of which coinciding with a longitudinal axis of said discharge pipe;

a group of apertures made in said lid and serving to remove a coolant from said cooled jacket;

a collector for feeding the coolant into the jacket and positioned on said jacket from the side opposite said lid;

a group of apertures made in said collector for supplying the coolant to said cooled jacket;

a discharge gate comprising a pipe, on one end of which, facing said lug, is positioned a cone-shaped tip, on the other end a lid with an aperture, adjacent which is positioned a pipe for discharge of the coolant;

a pipe for supplying the coolant, positioned coaxially with said pipe of the discharge gate in said aperture of the lid, one end of which being positioned adjacent the cone-shaped tip, another end protruding outside said lid.

It is advisable that the cone-shaped tip be made of one piece and consist of a first truncated cone having a large base and a smaller base and being rigidly secured by the large base to said pipe of the discharge gate, a second truncated cone having a large base and a smaller base, wherein the large base of said second truncated cone is the smaller base of said first truncated cone, a third cone having a base which is the smaller base of said second truncated cone.

It is advantageous that said first truncated cone and second truncated cone be made hollow.

It is preferable that the longitudinal axis of said discharge pipe be shifted toward a round portion of said U-shaped jacket.

The stated object is also achieved in that the induction melter, in accordance with the invention, comprises:

a housing, side walls and bottom of which are made of metal pipes disposed with a gap relative to each other and combined by a collector for supplying and discharging a coolant;

a hollow cooled lid provided with pipes for supplying and discharging the coolant;

pipes for loading a mixture of liquid radioactive wastes and vitrification agents, pipes for discharge of waste gases, pipes for returning filtrate and a port for technological servicing positioned in said lid;

a bushing positioned in said lid, the geometrical axis of which is parallel to the axis of said housing and the length of which is somewhat greater than the thickness of said lid; a discharge gate positioned in said bushing and provided with a drive for vertical displacement;

at least one pipe for positioning sensors of technological parameters of the process;

an inductor positioned adaptable for displacement along the longitudinal axis of said melter and concentrically encompassing said side walls of the housing, the gaps between the pipes of which ensuring transparency of the housing for an electromagnetic field of the inductor, the short inductor serving to create maximum magnetic field strength directly adjacent the moving surface of a melt produced during the input and melting of the mixture of liquid radioactive wastes and the vitrification agents;

a means for moving said inductor along the longitudinal axis of said melter;

an aperture in said bottom of the housing directly adjacent said wall;

a cooled discharge unit positioned in said aperture, the height of said cooled jacket of said discharge unit determining the minimum melt level, a portion of said cooled jacket being a part of the side wall of the housing and another portion of said cooled jacket facing the melt.

It is advisable that said pipe for discharge of waste gases contain a cooled jacket.

It is useful that said port for technological servicing be provided with a cooled lid.

It is advantageous that sensors selected from the following group be used as sensors of technological parameters: at least two melt surface temperature sensors, a sensor of the pressure of gases above the melt surface, a sensor of the temperature of gases above the melt surface, and a picture monitor.

The object is also achieved in that an installation for vitrification of liquid radioactive wastes, in accordance with the invention, comprises a mixer provided with a means for mixing components, having an input, a second input, and an output, a doser of vitrification agent additives, having an output coupled to said input of said mixer, a doser of heterogeneous liquid radioactive wastes, connected by its output to said second input of said mixer, a vessel-accumulator provided with a means for homogenization of components, having an input coupled to said output of said mixer and an output, a vortex apparatus serving to process the mixture of liquid radioactive wastes in a vortex layer, having an input connected to said output of said vessel-accumulator, and an output provided with a doser, a cooled induction melter with a movable inductor, having a first input connected to said output of said doser of the vortex apparatus, a second input, a first output for discharge of obtained melt of vitrified radioactive wastes and a second output for discharge of waste gases, a means for filtering waste gas having successively mounted coarse filters and fine filters, having an input connected to said second output of said melter, and an output, a condenser for condensing liquid vapors released from said melter, having an input connected to said output of said means for filtering waste gas and an output, a means for capturing gaseous toxic components, including an absorber, heater, catalytic reactor and condenser, and having an input coupled to an output of said condenser, and an output coupled to the atmosphere.

The object is also achieved in that an installation for vitrification of liquid radioactive wastes in accordance with the invention, comprises a vessel for receiving a dosed portion of homogeneous liquid radioactive wastes and collecting concentrated homogeneous liquid radioactive wastes, the vessel being linked to a collector of liquid radioactive wastes and having first and second inputs and an output, an evaporator having an input, provided with a gate and coupled to said output of said vessel to receive radioactive wastes, and having a first output coupled to second input of said vessel to receive radioactive wastes, and a second output, a separator for separating droplets of liquid from the steam-gaseous mixture, having an input connected to said second output of said evaporator, and having an output, a condenser for condensing steam having an input coupled to said output of said separator, and an output for the discharge of a condensate, a mixer provided with a means for mixing components, having an input provided with a gate and connected to said output of said vessel to receive concentrated homogeneous liquid radioactive wastes, a second input, third input and output, a doser of vitrification agent additives, having an output coupled to said second input of said mixer, a doser of heterogeneous liquid radioactive wastes, connected by its output to said third input of said mixer, a vessel-accumulator provided with a means for homogenization of components, having an input coupled to said output of said mixer and an output, a vortex apparatus serving to process the mixture of liquid radioactive wastes in a vortex layer, having an input connected to said output of said vessel-accumulator, and an output provided with a doser, a cooled induction melter with a movable inductor, having a first input connected to said output of said doser of the vortex apparatus, a second input, a first output for discharge of obtained melt of vitrified radioactive wastes and a second output for discharge of waste gases, a means for filtering waste gas having successively mounted coarse filters and fine filters, having an input connected to said second output of said melter, and an output, a second condenser for condensing liquid vapors released from said melter, having an input connected to said output of said means for filtering waste gas and an output, a means for capturing gaseous toxic components, including an absorber, heater, catalytic reactor and condenser, and having an input coupled to an output of said second condenser, and an output coupled to the atmosphere.

It is advisable that said coarse filter be coupled to said water-cooled induction melter.

BRIEF DESCRIPTION OF THE DRAWINGS

Further the invention will be explained by a description of preferable variants of its realization with references to the accompanying drawings in which.

DETAILED DESCRIPTION OF THE PREFERRED EMBODIMENTS

Figure 1:
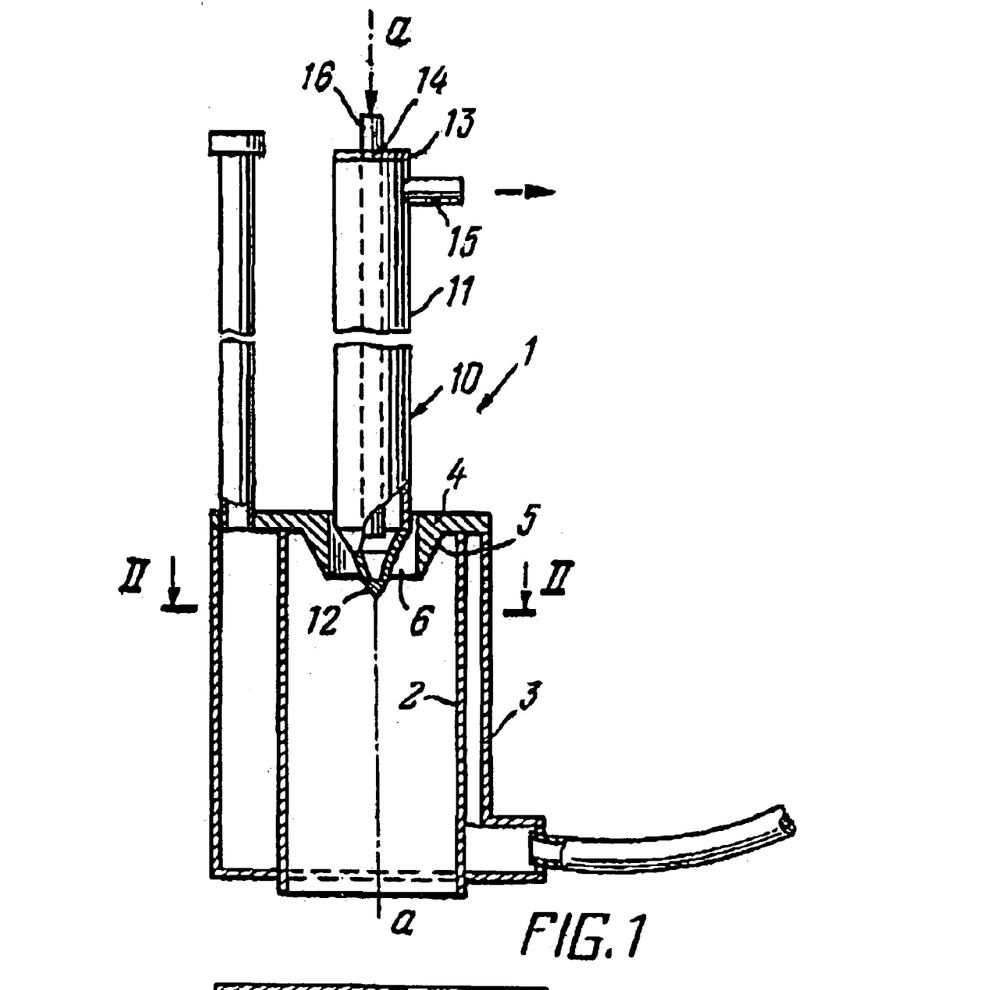
FIG. 1 shows a water-cooled discharge unit (longitudinal section), in accordance with the invention.

A cooled discharge unit 1 (FIG. 1) comprises a discharge pipe 2, a cooled jacket 3 having a U-shaped form in cross section (FIG. 2) and disposed on the discharge pipe 2 (FIG. 1). A lid 4 closes the cooled jacket 3 and the discharge pipe 2. A lug 5 in the form of a truncated cone from the side facing the discharge pipe 2 is made in the lid 4. A through cylindrical aperture 6 is made in the lug 5, the longitudinal axis a—a of which is aligned with the longitudinal axis of the discharge pipe 2.

Figure 3:
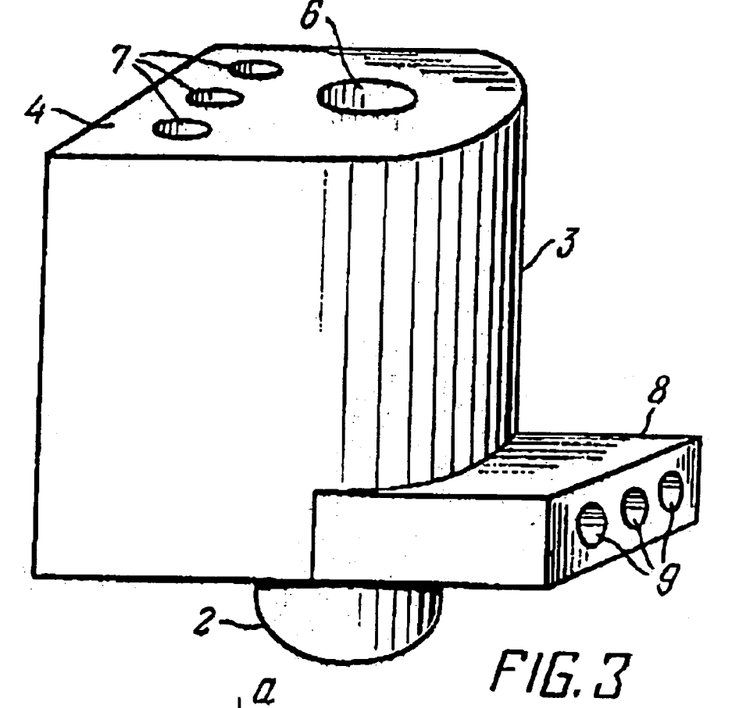
FIG. 3 shows a general view of the discharge pipe, in accordance with the invention.

Apertures 7 are made in the lid 4 (FIG. 3), the apertures serving to remove a coolant from the cooled jacket 3. A collector 8 for feeding the coolant into the jacket is positioned on the jacket from the side opposite the lid 4, i.e. in the lower part of the discharge unit 1. Apertures 9 are made in the collector 8 for supplying the coolant to the cooled jacket 3.

A discharge gate 10 (FIG. 1) comprises a pipe 11, on one end of which, facing the lug 5, is positioned a cone-shaped tip 12, while on the other end a lid 13 with an aperture 14 is disposed, directly adjacent which is positioned a pipe 15 for discharge of the coolant. A pipe 16 for supplying the coolant is positioned coaxially with the pipe 11 of the discharge gate in the aperture 14. One end of the pipe 16 is positioned directly adjacent the cone-shaped tip 12, while the other end protrudes outside the lid 13.

The cone-shaped tip 12 (FIG. 4) is made of one piece and consists of a first truncated cone 17 rigidly secured by the large base to the pipe 11 of the discharge gate, a second truncated cone 18, the large base of which is the smaller base of the first truncated cone 17, and a third cone 19, the base of which is the smaller base of the second truncated cone 18.

Figure 4:
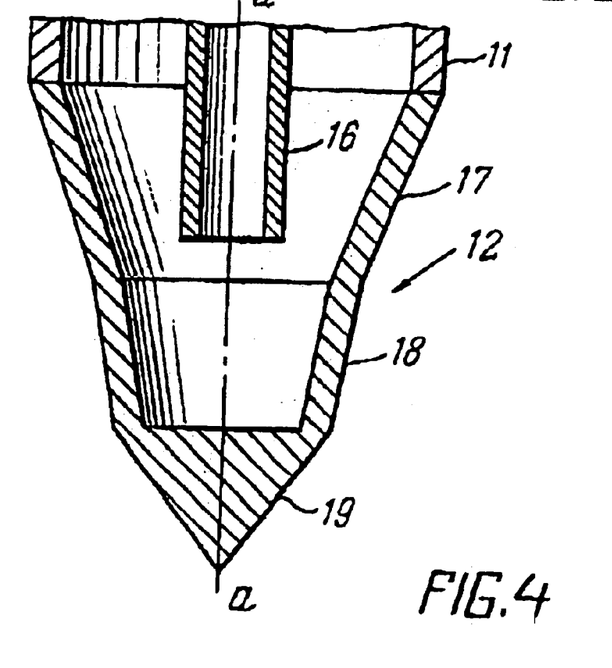
FIG. 4 shows a cone-shaped tip (longitudinal section), in accordance with the invention.

The first truncated cone 17 and the second truncated cone 18 are hollow.

Figure 2:
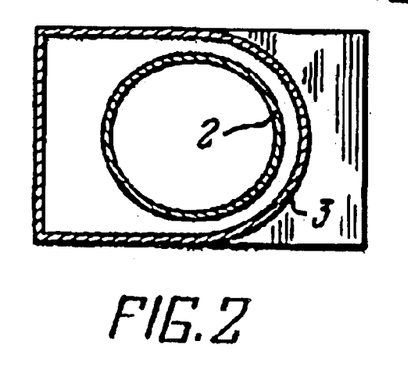
FIG. 2 shows a section along II—II in FIG. 1, in accordance with the invention.

The longitudinal axis a—a of the discharge pipe 2 is shifted toward the round portion of the U-shaped jacket 3 (FIG. 2).

A cooled induction melter 20 (FIG. 5) comprises a housing 21, side walls 22 and a bottom 23 of which are made of metal pipes disposed with a gap 24 and combined by a collector 25 for supplying and discharging a coolant. The melter comprises a hollow cooled lid 26 provided with pipes 27, 28 for supplying and discharging the coolant, respectively. Pipes 29 for loading a mixture of liquid radioactive wastes and vitrification agents, pipes 30 for discharging waste gases, pipes 31 for returning filtrate and a port 32 for technological servicing are disposed in the lid 26. A bushing 33 is also disposed in the lid 26, the geometrical axis of the bushing being parallel to the axis of the housing 21 and the length of the bushing is somewhat greater than the thickness of the lid 26. A discharge gate 10 is positioned in the bushing and is provided with a drive (not shown in FIG. 5) for vertical displacement.

Figure 5:
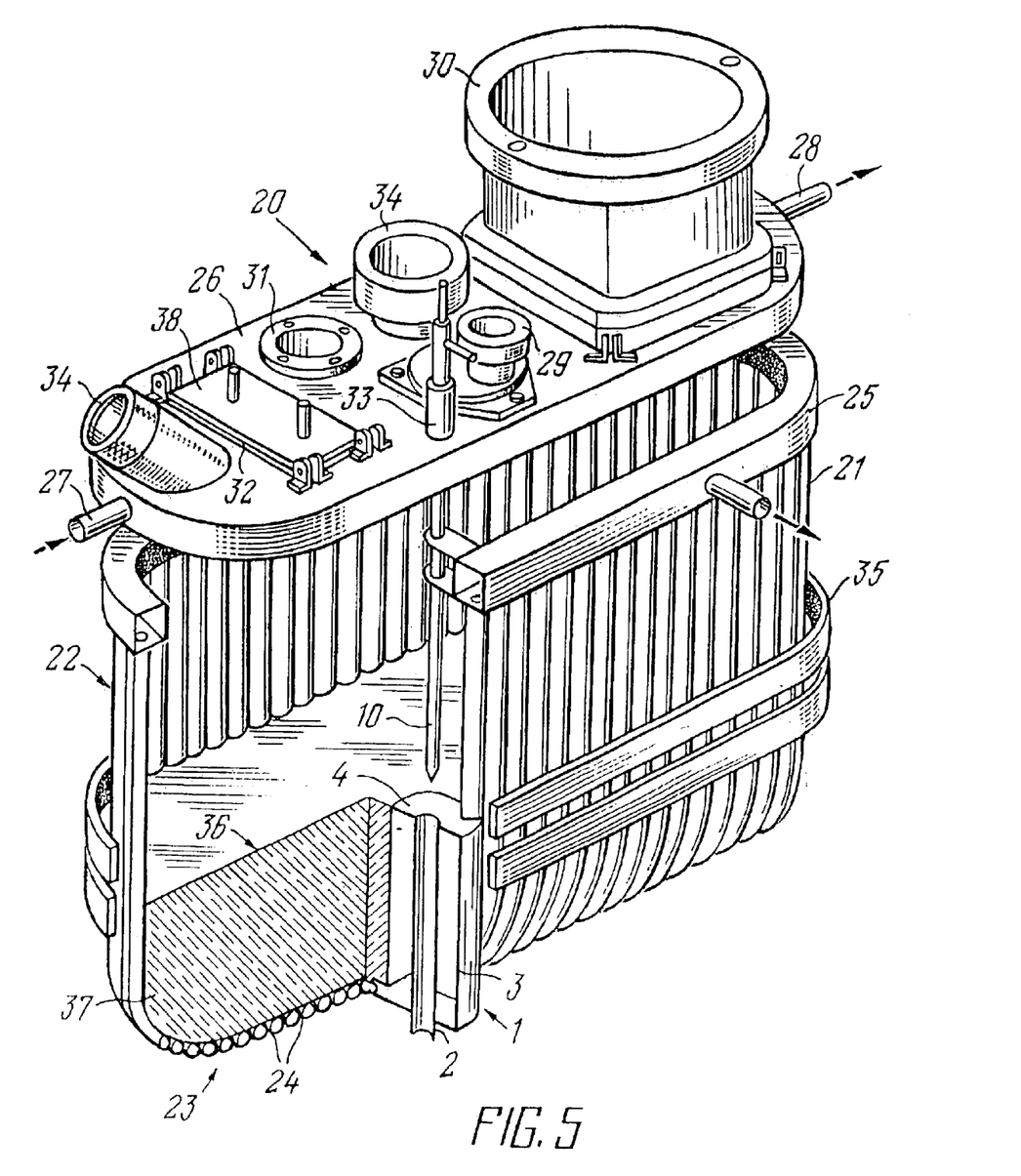
FIG. 5 shows a general view of a cooled induction melter, in accordance with the invention.

There are two pipes 34 provided in the lid 26 for positioning sensors of the technological parameters of the process (not shown in FIG. 5). At least two melt surface temperature sensors, a sensor of the pressure of gases above the melt surface, a sensor of the temperature of gases above the melt surface and a picture monitor are used as sensors of the technological parameters of the process.

An inductor 35 is positioned adaptable for displacement along the longitudinal axis of the melter 20 and concentrically encompasses the side walls 22 of the housing 21, the gaps 24 between the pipes of which ensure transparency of the housing 21 for an electromagnetic field of the inductor 35. The purpose of the displaceable inductor is to create maximum strength of the electromagnetic field directly adjacent a moving surface 36 of a melt 37 produced during the input and melting of a mixture of liquid radioactive wastes and vitrification agents. A means is provided for moving the short inductor along the longitudinal axis of the melter (not shown in FIG. 5).

An aperture for disposal of the cooled discharge unit 1 is made in the bottom 23 of the housing directly adjacent the wall 21. The height of the cooled jacket 3 determines the minimum level of the melt 37. A portion of the side wall of the cooled jacket 3 is a portion of the side wall 22 of the housing 21 and another portion of the cooled jacket 3 faces the melt 37.

The pipe 30 for discharge of waste gases contains a cooling jacket.

The port 32 for technological servicing is provided with a cooled lid 38.

An installation for vitrification of liquid radioactive wastes comprises a vessel 39 (FIG. 6) for receiving a dosed portion of liquid radioactive wastes and collecting concentrated homogenized liquid radioactive wastes, an input 40 of the vessel being coupled to an output 41 of a collector 42 of liquid radioactive wastes.

Figure 6:
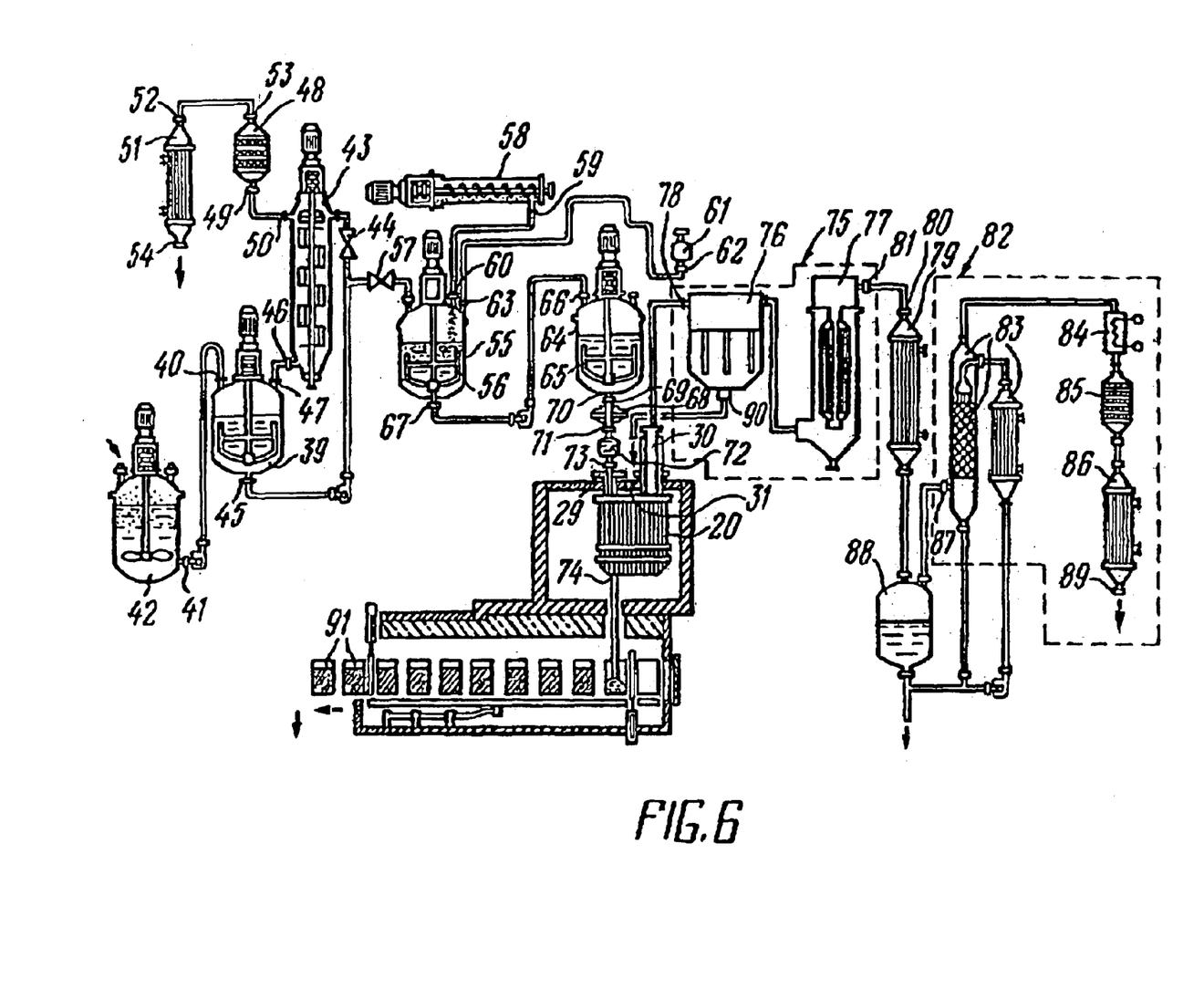
FIG. 6 shows a diagram of the installation for vitrification of liquid radioactive wastes, in accordance with the invention.

An evaporator 43 is provided with a gate 44 and is coupled to an output 45 of the vessel 39, wherein an output 46 of the evaporator 43 is coupled to a second input 47 of the vessel 39. A separator 48 serves to separate droplets of liquid from a steam-gas mixture, an input 49 of which is connected to a second output 50 of the evaporator 43.

A condenser 51 for condensing steam has an input 52 coupled to an output 53 of the separator 48 and has an output 54 for discharge of a condensate.

The installation contains a mixer 55 provided with a means 56 for mixing components and having an input provided with a gate 57, connected to the output 45 of the vessel 39.

A doser 58 of vitrifying additives is coupled by an output 59 to a second input 60 of the mixer 55. A doser 61 of heterogeneous liquid radioactive wastes is connected by an output 62 to a third input 63 of the mixer 55.

There is a vessel-accumulator 64 provided with a means 65 for homogenization of components, an 66 of which is connected to output 67 of the mixer 55.

A vortex apparatus 68 serves to process the mixture of liquid radioactive wastes in a vortex layer and is connected by input 69 to output 70 of the vessel-accumulator 64, while output 71 of the vortex apparatus 68 is provided with a doser 72.

A water-cooled induction melter with a movable inductor 20 has a first input 29 connected to an output 73 of the doser 72 of the vortex apparatus 68, a first output 74 for discharge of the obtained melt of vitrified radioactive wastes, and a second output 30 for discharge of waste gases.

The installation also comprises a means 75 for filtering waste gas having successively mounted coarse filters 76 and fine filters 77, wherein the input 78 of the means 75 is connected to the second output 30 of the melter 20.

A second condenser 79 serves for condensing liquid vapors released from the melter 20 and has an input 80 connected to an output 81 of the means 75 for filtering waste gas.

A means 82 for capturing gaseous toxic components includes an absorber 83, a heater 84, a catalytic reactor 85 and a condenser 86, and has an input 87 connected through a vessel 88 of a condenser of a filtering system to an output of the second condenser 79, and an output 89 coupled to the atmosphere.

The coarse filter 76 is coupled by output 90 to the pipe 31 of the cooled induction melter 20.

The installation operates in the following manner.

A portion of homogenized liquid radioactive wastes comprising cations of alkali and alkali-earth metals, for example, sodium, potassium, calcium, magnesium, and also cations of aluminum and iron and anions OH, $SO_4$, Cl, $CO_3$, $PO_4$ $NO_3$, and radioactive elements, e.g., strontium Sr, cesium Cs, cobalt Co and others from the collector 42 (FIG. 6) of liquid radioactive wastes from the output 41 are fed through input 40 to the vessel 39 for receiving a dosed portion of homogenized liquid radioactive wastes and collecting concentrated homogenized liquid radioactive wastes. Then the gate 58 is closed, the gate 44 opened and the evaporator 43 is activated. Evaporation is carried out by circulating liquid wastes from the evaporator 43 to the vessel 39 and back.

When the necessary degree of concentration, 900–1100 g/l, is reached, a portion of the concentrated homogenized liquid radioactive wastes is collected in the vessel 39. The waste steam-gas mixture through outlet 50 of the evaporator 43 is fed to the separator 48 where it is cleansed of droplets of liquid. Then the steam-gas mixture is directed to the condenser 51, where condensation of the steam takes place. After that the gaseous phase, having a volume activity according to cesium-137 and to plutonium-239 within prescribed limits, is released into the atmosphere.

After a portion of concentrated liquid homogenized radioactive wastes has been collected in the vessel 39, the gate 44 is closed and gate 58 opened. The concentrated wastes are fed from the vessel 39 through the output 45 and the gate 58 into the mixer 55, after which the gate 58 is closed, gate 44 is opened and a new portion of homogeneous liquid radioactive wastes is fed into the vessel 39 to carry out the next cycle of concentrating and collecting radioactive wastes Simultaneously with concentrated homogenized liquid radioactive wastes, a portion of vitrifying (fluxing) additives comprising oxides of silicon, boron, aluminum and calcium is fed through the input 60 from the doser 58, and through the input 63—a portion of heterogeneous liquid radioactive wastes comprising radioactive ion-exchange resins, radioactive pearlite, radioactive activated carbon and radioactive soil. The humidity of the mixture is from 0.0001 to 60% in an amount from 1 to 9 parts by weight to a part by weight of the mixture of concentrated homogenized liquid radioactive wastes with fluxing additives. The ratio of the fluxing additives and concentrated liquid radioactive wastes is from 30 to 50% by weight of dry salts, where from 42 to 77% are moist salts and from 58 to 23% of fluxing additives. A datolite concentrate, boric acid, calcium metaborate, bentonite, quarts sand can be used as the fluxing additives. The following ratio of concentrated homogenized liquid radioactive wastes and fluxing additives is a possible concrete example: 52% of concentrated salts, 48% of fluxing additives, including 24% of datolite concentrate, 12% of quartz sand and 12% of bentonite clay. The obtained mixture is mixed in the mixer 55 using the means 56 for mixing and is fed through the output 67 to the vessel-accumulator 64.

Where it is only necessary that processing of the liquid heterogeneous radioactive wastes be carried out, the composition of the vitrifying additives is corrected.

A starting glass melt is created in the cooled induction melter 20 with a movable inductor, after which the radioactive mixture is fed through the output 70 into the vortex apparatus 68 where it is processed in the vortex layer. Activation of the surface of the solid phase of the mixture occurs during the processing, the mixture itself is subjected to the action of a magnetic field, hydrodynamic and acoustic impacts, electrization, local high temperatures and pressures.

The processed mixture from the vortex apparatus 68 through the doser 72 is fed to the input 29 of the cooled induction melter with a movable inductor 20. During the process of feeding, the doser 72 carries out automatic adjustment of the position of the displaceable inductor 20 depending on the amount of the loaded mixture. The radioactive mixture in the inductor 20 is subjected to heating and melting while oxylith is simultaneously fed thereto and is converted into a melted vitric form. After that the output 74 for discharge of the melt is opened and the melt is discharged into receiving containers 91.

The waste gases are discharged from the melter 20 through the output 30 and directed to the input 78 of the means 75 for filtering waste gases. The gases purified by the filters are fed through the output 81 to the input 80 of the condenser 79, in which condensation of vapors of the liquid takes place. The waste gases and the waste liquid condensate from the condenser 79 are fed into the vessel 88, where separation of the gaseous and liquid fractions takes place. Gas from the vessel 88 is fed to the input 87 of the means 82 for capturing gaseous toxic components, the purified gas is discharged into the atmosphere through the output 89. As an example, the following concrete parameters of the waste gas can be indicated. The concentration of nitrogen oxides is less than 10 mg/m$^3$, the concentration of hydrogen chloride is less than 10 mg/m$^3$, the concentration of sulfur oxides is less than 30 mg/m$^3$, the volume activity according to cesium-137 is less than 1000 Bk/m$^3$, to plutonium-239— less than 0.1 Bk/m$^3$.

Reduction of the residual toxic nitrous gases to nitrogen takes place after the absorber 83 in the catalytic reactor 85, wherein the heater 84 hinders the formation of a condensate and ensures reliability of operation of the catalytic reactor 85.

The filtrate through the output 90 of the coarse filter of the means 75 is directed to the cooled induction melter 20. The condensate from the vessel 88 is directed as replenishment to the washing liquid circulation system of the absorber 83 of the means 82, and the spent washing liquid with specific activity according to cesium-137 which is less than the prescribed limit is released.

Subsequent portions of the initial homogeneous and heterogeneous liquid radioactive wastes are directed for further processing according to the process described above.

The cooled induction melter 20 with the movable inductor operates in the following manner.

A portion of a mixture of vitrification agents, heterogeneous liquid radioactive wastes and a concentrate of homogenized liquid radioactive wastes is fed by means of the doser 73 to the melter 20 with the preliminarily created starting melt of the glass melt and with the discharge gate 10 closed. Wherein, the doser depending on the amount of the mixture being fed carried out automatic adjustment of the most optimum positioning of the movable short inductor 35, i.e. at which maximum efficiency is achieved.

The mixture of the aforesaid components will be fed until the whole working volume of the melter 20 is filled with glass melt being formed. Then the glass melt is held at a temperature of 900–1300 degrees Centigrade in order to complete the processes of vitrification, after which the aperture 6 is opened and a discharge into receiving containers 91 takes place. After discharge the aperture 6 is closed and the next cycle of operation of the melter 20 is carried out.

Since the lid 4 (FIG. 5) of the cooled discharge unit 1 is positioned higher than the level of the bottom of the cooled induction melter 20, some amount of glass melt remains therein after each discharge and this amount is used as a starting melt in each subsequent cycle of vitrification.

The cooled discharge unit 1 (FIG. 1) operates in the following manner.

In the closed state of the discharge unit 1, the pipe 11 of the discharge gate 10 is disposed inside the through cylindrical aperture 6 of the lug 5, fully covering its cross section, wherein the cone-shaped tip 12 of the discharge gate 10 is positioned inside the discharge pipe 2 below the lug 5.

After the cycle of vitrification of liquid radioactive wastes is completed, the discharge gate 10 is raised by means of a moving mechanism (not shown in FIG. 1) until the through cylindrical aperture 6 of the lug 5 is completely open. The discharge unit 1 is in the open state during the whole period of discharging the glass melt, after which the discharge gate 10 returns to the initial position. Due to the aforesaid configuration of the cone-shaped tip 12, a guaranteed removal takes place of the glass plug which is formed after discharge from the aperture 6 is over.

Cooling of the discharge unit 1 ensures the reliability of its operation, since otherwise the discharge unit 1 is subjected to intensive corrosion and may break down. The "U"-shaped cooled jacket hinders the danger of the occurrence of an emergency situation, since if there are any units in the configuration or, what is even worse, corner joints, at the places where they are positioned overheating zones are formed, as a consequence of which destruction occurs. With any other form of cooled jacket, without corner joints, zones of local overheating will be formed in the near-wall zone due to the compaction of the lines of force of the electromagnetic field. A consequence of this will be that a larger amount of aerosols and volatile forms of radio nuclides will be carried away from the overheating zone, which does not ensure the effect of improving the safety of operation of the apparatus.

Inclusion of the vortex apparatus in the construction of the installation and also the use of the movable inductor and cooled induction melter make it possible to reduce the time necessary for vitrification of radioactive wastes by the obtainment of a vitrified product with a higher degree of dispersion and activity on its surface in the vortex apparatus, stabilization of the working temperature of the surface f the melt due to the presence of the movable inductor, and also by intensification of self-stirring of the glass melt in the cooled induction melter.

The construction and arrangement of the cooled discharge unit in the composition of the cooled induction melter with the movable inductor also promotes enhancement of productivity of the device, due to the incomplete discharge of the glass melt, the residue of which is used as the starting melt in each subsequent cycle of vitrification of radioactive wastes, which reduces the time during which it is carried out as compared with known methods.

As a result, the productivity of the installation increases by 1.2–1.3 times. Furthermore, the use of the cooled induction melter makes it possible to substantially reduce its corrosion with the glass melt due to the preventive action of the lining slag layer, thus enhancing the safe operation of the installation.

The arrangement of the condenser in the scheme for purification of gases released from the melter after the means for filtration of waste gases makes it possible to obtain a practically non-radioactive condensate with a specific radioactivity according to cesium-137 which is less than 100 Bk/kg, without the need for feeding it into the collector of radioactive liquid wastes for reprocessing, and this also increases the productivity of the installation.

The possibility for supplying heterogeneous liquid radioactive wastes comprising radioactive ion-exchange resins for vitrification without going through the evaporator excludes a break-down due to the danger of the resin melting and ensures expansion of the possibility of using the installation for processing radioactive wastes of different composition. The separate execution of the unit for rendering wastes harmless ensures the operation of the installation as a whole, since the ingress of the steam-gas mixture, containing a greater amount of moisture, into the means for filtering waste gases from the evaporator results in a rapid breakdown of that means.

Use of the absorber and the catalytic reactor ensures reduction of the content of chlorine-containing and nitrose components in the gases discharged into the atmosphere after purification to the maximum permissible limits. For example, the concentration of nitrogen oxides is less than 10 mg/m$^3$, the concentration of hydrogen chloride is less than 10 mg/m$^3$, the concentration of sulfur oxides is less than 30 mg/m$^3$.

We claim:

1. A cooled discharge unit comprising
   a discharge pipe,
   a cooled jacket having a U-shaped form in cross section and disposed on said discharge pipe,
   a lid covering said cooled jacket and said discharge pipe,
   a lug in the form of a truncated cone made in said lid from a side facing the discharge pipe,
   a through cylindrical aperture made in said lug, a longitudinal axis of which coincides with a longitudinal axis of said discharge pipe,
   a group of apertures made in said lid and serving to remove a coolant from said cooled jacket,
   a collector for feeding the coolant into the jacket and positioned on said jacket from a side opposite said lid,
   a group of apertures made in said collector for supplying the coolant to said cooled jacket,
   a discharge gate comprising a tube having at one end facing said lug a cone-shaped tip, and having at another end a lid with an aperture, adjacent to which is a branch pipe for discharge of a coolant from the discharge gate, and
   a supply pipe for supplying the coolant into the discharge gate positioned coaxially with said tube of the discharge gate in said aperture of the lid, with one end of the supply pipe being positioned adjacent the cone-shaped tip, and another end protruding outside of said lid.

2. A cooled discharge unit of claim 1, wherein the cone-shaped tip is made of one piece and comprises
   a first truncated cone having a large base and a smaller base and being rigidly secured by the large base to said tube of the discharge gate,
   a second truncated cone having a large base and a smaller base, wherein the large base of said second truncated cone is the smaller base of said first truncated cone, and
   a third cone having a base which is the smaller base of said second truncated cone.

3. A cooled discharge unit of claim 2, wherein said first truncated cone and said second truncated cone are hollow.

4. A cooled discharge unit of claim 1, wherein the longitudinal axis of said discharge pipe is shifted toward a round portion of said U-shaped jacket.

5. A discharge unit of claim 2, wherein the cone-shaped tip consists of the first truncated cone, the second truncated cone and the third cone.

6. A discharge unit of claim 5, wherein the first truncated cone and second truncated cone are hollow.

* * * * *